United States Patent [19]
Gray

[11] 4,140,258
[45] Feb. 20, 1979

[54] METHODS AND APPARATUS FOR SEPARATING GLASS SHEETS INTO SEPARATE SHEET PORTIONS

[75] Inventor: Martin E. Gray, Ormskirk, England

[73] Assignee: Pilkington Brothers Limited, St. Helens, England

[21] Appl. No.: 663,944

[22] Filed: Mar. 4, 1976

[30] Foreign Application Priority Data
Mar. 6, 1975 [GB] United Kingdom ............... 9462/75

[51] Int. Cl.² ........................... B26F 3/00; C03B 33/02
[52] U.S. Cl. .......................................... 225/2; 83/102; 83/152; 225/96.5; 225/103
[58] Field of Search ....................... 225/101, 100, 1, 2, 225/96.5, 103; 83/152, 102; 271/194

[56] References Cited
U.S. PATENT DOCUMENTS

| | | | |
|---|---|---|---|
| 531,874 | 1/1895 | Shuman | 225/2 |
| 1,885,245 | 11/1932 | Fix | 225/101 |
| 2,612,063 | 9/1952 | Wangelin | 225/101 X |
| 3,176,558 | 4/1965 | Gustavson | 83/152 X |
| 3,178,085 | 4/1965 | Jochim | 225/2 |
| 3,330,092 | 7/1967 | Hill | 83/152 X |

*Primary Examiner*—Frank T. Yost

*Attorney, Agent, or Firm*—Sughrue, Rothwell, Mion, Zinn and Macpeak

[57] ABSTRACT

For separating glass sheets, especially sheets of wired glass, into separate sheet portions and stacking the sheet portions in spaced stacks, the sheets are cut to define the sheet portions, which are gripped by respective relatively movable groups of suction gripping devices. The cutting may be effected by scoring the glass sheet before it is gripped by the suction devices, and then snapping it either before or after gripping it with the suction devices. The sheets may be lifted from a roller delivery conveyor into engagement with the suction gripping devices by a series of transverse lifting tines. The groups of suction gripping devices are then moved apart to separate the cut sheet portions, and in the case of wired glass this also severs the wires. The suction gripping devices are mounted on a carriage so that, while still held by the suction gripping devices, the separated sheet portions can be transported laterally to a stacking station, at which they are released to drop on to respective stacks of similar sheet portions on a stacking table. A transfer carriage with lifting arms is provided to transfer the stacks to the pivoted arms of a tilt table for swinging the stacks into a vertical position ready for subsequent removal.

16 Claims, 19 Drawing Figures

METHODS AND APPARATUS FOR SEPARATING GLASS SHEETS INTO SEPARATE SHEET PORTIONS

BACKGROUND OF THE INVENTION

1. Field of the Invention

This invention relates to methods and apparatus for separating glass sheets into spaced separate sheet portions, e.g. for the purpose of forming stacks of similar sheet portions which can subsequently be packaged. The invention is particularly, though not exclusively, applicable to the handling of wired (i.e. wire-reinforced) glass sheets, where large sheets of wired glass are to be cut into smaller sheets, which are then to be stacked and packaged.

2. Description of the Prior Art

In the production of flat glass, for example of the rolled plate type which includes wired glass, or of the float glass type, or of the drawn sheet glass type, a ribbon of glass of a fixed width is produced, which is cut transversely to form sheets of the same width as the ribbon (from which selvedges may then be removed). It is, however, often necessary to cut these sheets into smaller sizes before packaging the cut sheets for transport and sale, and it is generally desirable than such cutting to size should be performed on the production line. Problems then arise in handling the cut sheets, particularly in removing them from the production line, separating sheets of different sizes, and stacking the sheets ready for packaging. Such problems are particularly acute in the case of wired glass because the conventional cutting technique of scoring and snapping the glass does not sever the wires in the glass.

A sheet stacking arrangement is known, in which a lifting device comprising an array of suction gripping devices is lowered to pick up successive complete sheets from a conveyor and is then raised and moved laterally to deposit the sheets one by one on a stack on a table to one side of the conveyor.

SUMMARY OF THE INVENTION

The present invention has for object to provide an arrangement in which sheets which are cut to divide them into two or more sheet portions can be picked up and the portions separated, e.g. for subsequent stacking.

According to the present invention, in a method of separating glass sheets into spaced separate sheet portions wherein the sheets are cut to define the sheet portions, the sheet portions are gripped by respective groups of suction gripping devices, and a relative movement of the groups of gripping devices is then caused so as to move them apart in a direction substantially parallel to the plane of the sheet, and thereby to separate the sheet portions from one another.

In the case where the sheets are of wired glass, the cutting to define the sheet portions will normally leave the wires unsevered, as mentioned above, and the movement apart of the gripping devices effects the necessary severance of the wires.

The sheets may be cut by scoring and snapping before being fed by a conveyor to the gripping device. In an alternative arrangement, the sheets are scored to define the sheet portions before being fed by a conveyor to the gripping devices, and the cutting is completed by snapping the sheets while the sheet portions are gripped by the gripping devices.

In general, the separated sheet portions, while still held by the gripping devices, are transported laterally to a stacking station, where they are released by the gripping devices so as to drop on to respective stacks of similar sheet portions. The stacks may be periodically transferred from the stacking station to a tilt table on which they are tilted into a position in which the sheet portions are substantially vertical, for subsequent removal.

The invention also provides apparatus for separating glass sheets into spaced separate sheet portions, comprising a delivery conveyor for the glass sheets which have been pre-scored or pre-cut to define the sheet portions, at least two groups of suction gripping devices disposed so that the respective sheet portions of a sheet delivered by the delivery conveyor can be gripped by respective groups of the gripping devices, mounting means by which said groups are mounted so as to be relatively movable towards and away from one another in a plane substantially parallel to the conveying plane of the delivery conveyor, and means for moving apart said groups of gripping devices so as to separate the respective sheet portions gripped thereby.

Preferably means are provided for lifting the glass sheets from the delivery conveyor into engagement with the suction gripping devices. Where the delivery conveyor is a roller conveyor, the means for lifting the glass sheets may comprise a series of tines which extend transversely to the conveying direction, and which can be raised and lowered between successive rollers of said conveyor.

For use with glass sheets which have been pre-cut before delivery by the conveyor, the upper surfaces of the tines may be horizontal. Alternatively, for use with glass sheets which have been pre-scored but not pre-cut before delivery by the conveyor, an arrangement may be employed wherein the upper surfaces of the tines are curved, and said mounting means incorporate a pivotal mounting for at least some of the groups of suction gripping devices, so as to apply a bending moment to the glass sheets as each sheet is lifted into engagement with the gripping devices and thereby to cause snapping of the sheet along the score line or lines.

Advantageously the groups of suction gripping devices are connectible through respective independently controllable valves to a source of suction so that a gripping action or a release action can be effected in one or more groups independently of the other group or groups. The groups of suction gripping devices may also be connectible through said valves to a source of compressed air to assist the release action.

Preferably the mounting means for groups of suction gripping devices are carried on a common carriage which can be moved laterally from a take-off station above the delivery conveyor to a stacking station to one side of the conveyor. The stacking station may comprise a stacking table disposed to receive the separated sheet portions from the suction gripping devices and to accumulate spaced stacks of the sheet portions.

Preferably the stacking table is apertured to accommodate stack-supporting arms of a transfer carriage, and means may be provided for raising and lowering said stack-supporting arms, whereby the stacks can be lifted from the stacking table to become supported on said transfer carriage. A tilt table may be arranged to receive the stacks from the transfer carriage (e.g. by lowering of said stack-supporting arms to deposit the stacks on the tilt table) and to tilt them into a substantially vertical position for subsequent removal. The tilt table may comprise a plurality of pivoted arms between which the stack-supporting arms of the transfer carriage can fit, for receiving the stacks, and retractable stops on said pivoted arms, disposed so as to be capable of separating said stacks and of supporting them when the pivoted arms are swung into said substantially vertical positions.

DETAILED DESCRIPTION OF THE INVENTION

Figure 1:
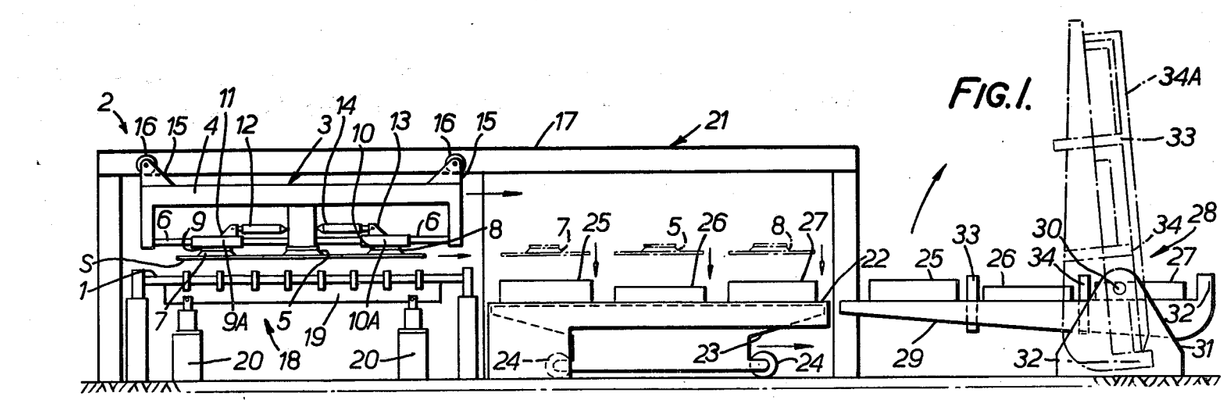
FIG. 1 is a side elevation of an apparatus for separating glass sheets into spaced separate sheet portions, and stacking the separated sheet portions.
Figure 3A:
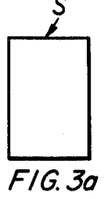
FIGS. 3(a)-3(e) show alternative cutting configurations for separation of the glass sheets into sheet portions of different forms.
Figure 3B:
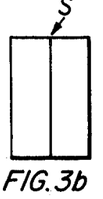
Figure 3C:
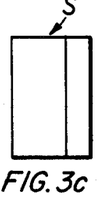
Figure 3D:
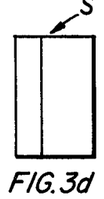
Figure 3E:
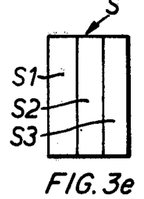
Figure 10:
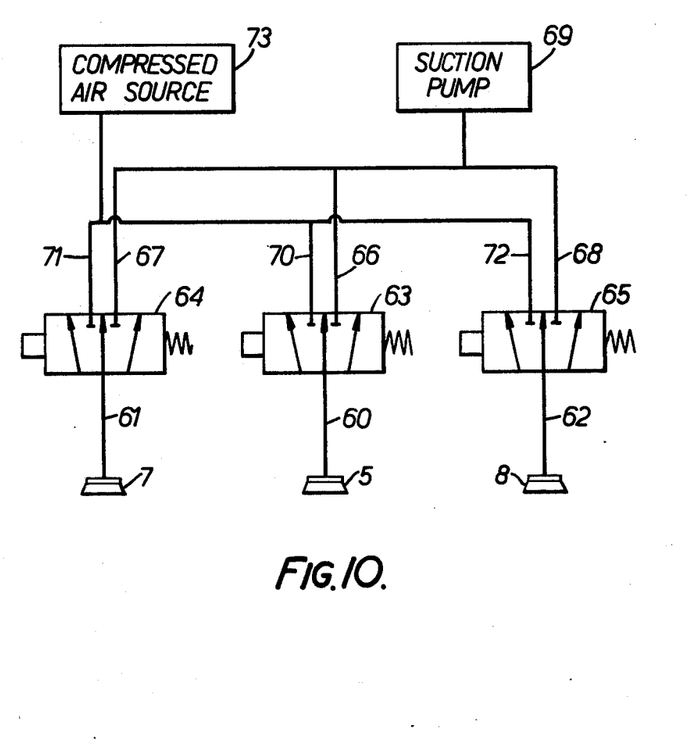
FIG. 10 is a schematic diagram illustrating the pneumatic connections to gripping devices in the form of suction pads used in the apparatus of FIG. 1.

Referring to FIGS. 1 and 10, wired glass sheets S are successively conveyed on a horizontal roller conveyor 1 in a direction normal to the plane of FIG. 1 to a take-off station 2. Each sheet S arriving at the take-off station is divided into three sheet portions S1, S2, S3, by two longitudinal cuts as shown in FIG. 3(e), where the glass has been scored and snapped but the reinforcing wires extend unsevered across the cuts.

A sucker carriage 3, carrying gripping devices in the form of suction pads, is located at the take-off station 2 above the conveyor 1. The carriage 3 comprises a frame 4 which supports a central row of suction pads 5 (the row running normal to the plane of FIG. 1) and further supports a plurality of parallel horizontal transverse rails 6 on which two further rows of suction pads 7 and 8 respectively, normal to the plane of FIG. 1, are carried by respective mountings 9 and 10 slidable by means of sleeves 9A, 10A on the rails 6. The mountings 9 for the row of pads 7 are connected by a bracket 11 to a hydraulic jack 12 which can be operated to move the row of pads 7 horizontally away from, and back towards, the central rows of pads 5. The mountings 10 for the row of pads 8 are similarly connected by a bracket 13 to a hydraulic jack 14 which can be operated to move the row of pads 8 horizontally away from and back towards, the central row of pads 5. A source of suction, such as a suction pump 69 (FIG. 10), is provided for applying suction to the pads 5, 7, 8 in known manner, and a source 73 of compressed air may also be connectible to the pads 5, 7, 8 for positively releasing their grip, when desired. As illustrated in FIG. 10, the arrangement may be such that the pads 5, 7, 8 of each row are connected by respective lines 60, 61, 62 to respective solenoid-operated valves 63, 64, 65, each of which can be shifted independently of the others between three positions. In a first or rest position, as shown in FIG. 10, the respective valve connects its row of pads to atmosphere. In a second position, when shifted to the left in FIG. 10, the valve connects its row of pads through a respective line 66, 67, 68 to the suction pump 69. In the third position, when shifted to the right in FIG. 10, the valve connects its row of pads through a respective line 70, 71, 72 to the source 73 of compressed air. By use of the valves 63, 64, 65, the rows 5, 7, 8 of suction pads can thus be connected independently of one another to the suction source 69 or to the compressed air source 73, or to atmosphere, so that a gripping action or a release action can be effected in one or more selected rows independently of the action which is being effected in the other row or rows.

The suction pump 69, the compressed air source 73, the valves 63, 64, 65 and the air lines 60, 61, 62, 66, 67, 68, 71, 72 are all mounted on the carriage 3 as close as possible to the suction pads 5, 7, 8 but they are not shown in FIG. 1 for the sake of clarity. The solenoid-operated valves 63, 64, 65 are electrically connected to a control position (not shown).

The sucker carriage frame 4 is suspended by brackets 15 carrying wheels 16 from an overhead gantry 17 providing rails along which the wheels 16 run. The entire sucker carriage 3 can thus be moved horizontally, transversely to the length of the conveyor 1.

At the take-off station 2 beneath the sucker carriage 3 is a rising table 18 comprising horizontal tines 19 which are disposed between successive rollers of the conveyor 1 and which can be raised and lowered by hydraulic jacks 20.

The operation of the apparatus so far described is as follows. The conveyor 1 carries a glass sheet S to the take-off station 2 and stops when the sheet is located beneath the sucker carriage 3 and over the rising table 18. The sheet has previously been squared up and aligned on the conveyor 1 so that the central portion S2 (FIG. 3) of the sheet between the longitudinal cut lies beneath the central row of sucker pads 5 while the outer portions S1, S3, lie respectively beneath the rows of pads 7 and 8. The rising table 18 is then operated by actuation of the jacks 20 to raise the tines 19 between the rollers of the conveyor 1 and lift the sheet S into engagement with the suction pads 5, 7 and 8, to which suction is applied through the valves 63, 64 and 65. The pads hold the sheet suctionally and the tines 19 are lowered by the jacks 20 to a position slightly below the conveying level on the conveyor 1 ready for receipt of a further sheet. The jacks 12 and 14 are actuated to move the outer rows of suction pads 7 and 8 away from the central row of pads 5. This action forces the suctionally held outer portions S1, S3 of the sheet away from the suctionally held centre portion S2 and thereby breaks the reinforcing wires extending across the cuts by tension snapping, as well as effecting a desired separation between the sheet portions S1, S2, S3. The sucker carriage 3 is then moved along the gantry 17 with the sheet portions held spaced apart. In practice, lowering of the tines 19 may occur simultaneously with actuation of the jacks 12 and 14, and/or the jacks 12 and 14 may be operating to move the rows of suction pads apart while the sucker carriage is travelling along the gantry 17.

The gantry 17 extends over a stacking station 21 at which there is a stacking table 22 and an associated transfer carriage 23 having wheels 24 on which it can travel along the floor. Both the stacking table 22 and the transfer carriage 23 have longitudinal support arms parallel to the plane of the paper in FIG. 1, the arms of each interfitting into the apertures between the arms of the other. The sucker carriage 3, moving along the gantry 17, is brought to rest over the stacking table 22 and the valves 63, 64 and 65 are operated to cut off the suction applied to the pads 5, 7 and 8 and to supply compressed air instead, so as to release the sheet portions S1, S2, S3, which drop on to the stacking table 22. The valves 63, 64 and 65 and then returned to the rest position shown in FIG. 10. The sucker carriage 3 is returned back along the gantry to its position over the rising table 18 at the take-off station 2 and the jacks 12 and 14 are operated to move the outer rows of suction pads 7 and 8 back towards the central row of pads 5 in readiness for receipt and separation of a further sheet.

In this manner successive sheets S are separated and their portions S1, S2, S3 are deposited on the stacking table 22 to form three spaced piles or stacks 25, 26 and 27. The stacking table 22 is at a fixed horizontal level. If desired, however, means may be provided to lower the stacking table gradually (e.g. by one sheet's thickness after each deposit) in a manner well known per se. When the stacks contain a desired number of sheet portions, the stacks are transferred to a tilt table 28 having arms 29 swingable about a pivot 30 on a base 31. The support arms of the transfer carriage 23 are raised to lift the stacks 25, 26 and 27 from the stacking table 22 to position the bottom of the stacks at a level slightly above that of the arms 29, which are then in the horizontal position shown in full lines in FIG. 1. The transfer carriage 23 is then moved towards the tilt table 28 to position the stacks over the arms 29, the latter being received in the apertures between the support arms of the transfer carriage 23. The transfer carriage comes to rest when the stacks are suitably located over the arms 29, and its support arms are then lowered to deposit the stacks on to the arms 29 of the tilt table 28. The transfer carriage 23, after depositing the stacks on the tilt table arms 29, is returned to its position under the stacking table 22 in readiness for receipt of a further set of stacks. The stacking table and transfer carriage are described in further detail later with reference to FIG. 6.

Figure 2:
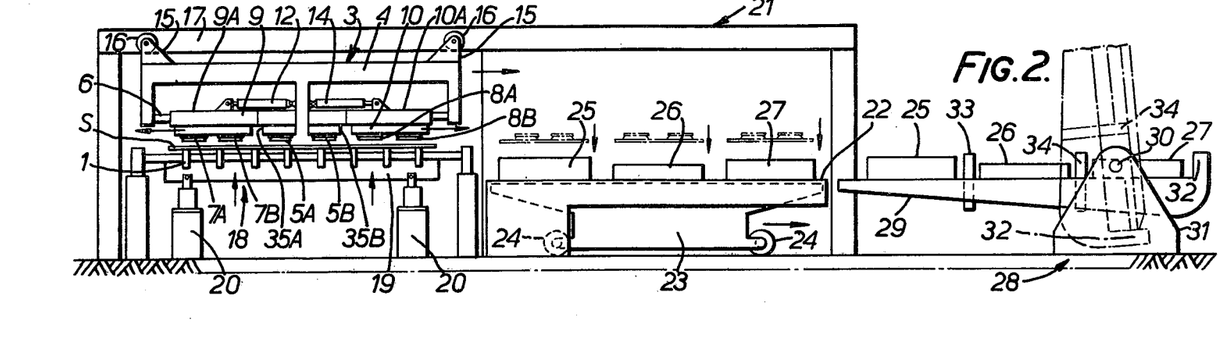
FIG. 2 is a side elevation of a modified form of the apparatus of FIG. 1.

The arms 29 of the tilt table 28 are provided with back stops 32 and further retractable stops or spacers 33 and 34 which are retracted during the loading operation just described and are then raised so that they become inserted respectively between the stacks 25 and 26 and between the stacks 26 and 27, as shown in FIG. 2. Safety bars 34A (shown in broken lines in FIG. 1) may also be placed across the tops of the stacks, the safety bars being fitted into the stops 32, 33 and 34. The arms 29 are then swung about the pivot 30 to locate the stacks in nearly vertical disposition (as shown in broken lines in FIG. 1), the stacks becoming supported on the respective stops 33, 34 and 32. The stacks 25, 26, 27 can then be removed from the tilt table 28 (after removal of the safety bars 34A if applied) and transferred to pallets, e.g. by use of a hoist arrangement essentially in known manner. After removal of the stacks, the arms 29 are returned to their horizontal position and the stops 33 and 34 retracted (i.e. lowered) in readiness for receipt of a further set of stacks from the stacking table 22.

The arrangement shown in FIG. 2 is basically the same as that shown in FIG. 1 and described above, except that there are six rows of suction pads on the sucker carriage 3. The two rows 7A and 7B on one side (corresponding to row 7 in FIG. 1) are fixed relatively to each other by a common mounting 9 and supplied with suction or compressed air through a common valve like the valve 64 of FIG. 10, and the two rows 8A and 8B on the other side (corresponding to row 8 in FIG. 1) are similarly fixed relative to each other by a common mounting 10 and supplied through a common valve corresponding to valve 65. The centre rows 5A and 5B (corresponding to row 5 in FIG. 1) are, however, movable relative to each other, having separate respective mountings 35A and 35B slidable on the rails 6, and they are supplied through separate valves (not shown). With this arrangement the apparatus can accommodate different cutting configurations, as shown in FIGS. 3 and 4. The different combinations of the rows of suction pads 7A, 7B, 5A, 5B, 8A, 8B, shown in FIGS. 4(a) to (e) correspond with the different cutting configurations shown in FIGS. 3(a) to (e). FIGS. 4(a) to (e) illustrate how each centre row 5A, 5B can be linked with the other centre row, and/or the adjacent pair of rows 7A, 7B, or 8A, 8B, to provide different separation configurations. It will be appreciated that when the configuration is one in which each sheet is split into two portions, two stacks will be built up on the stacking tables 22 and transferred to the tilt table 28.

Figure 5:
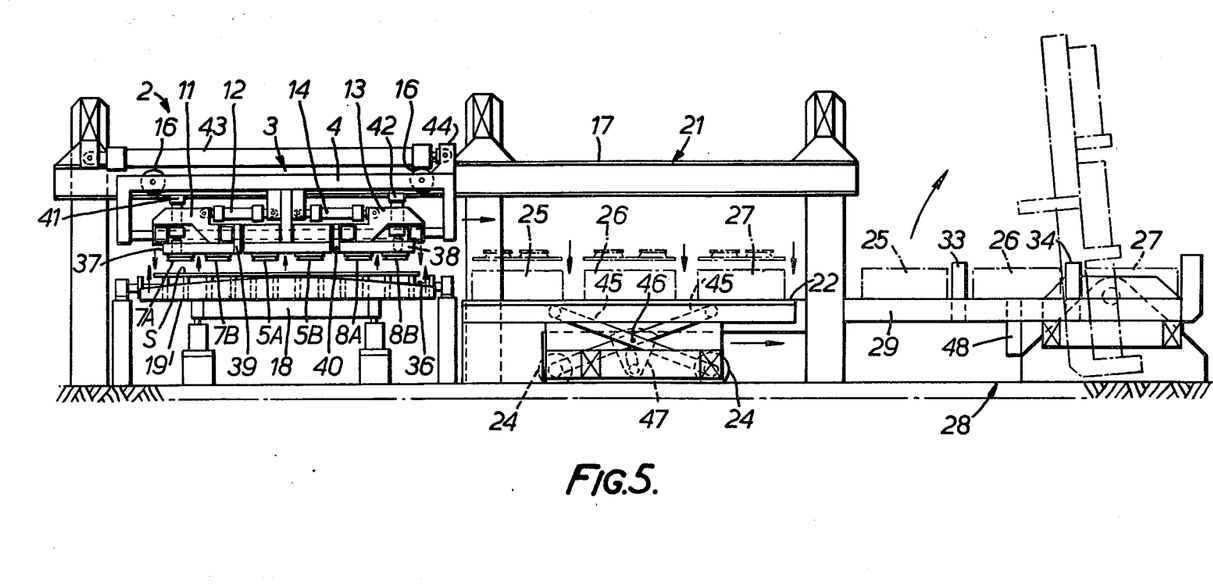
FIG. 5 is a side elevation similar to FIGS. 1 and 2 showing a further modified form of the apparatus.
Figure 7:
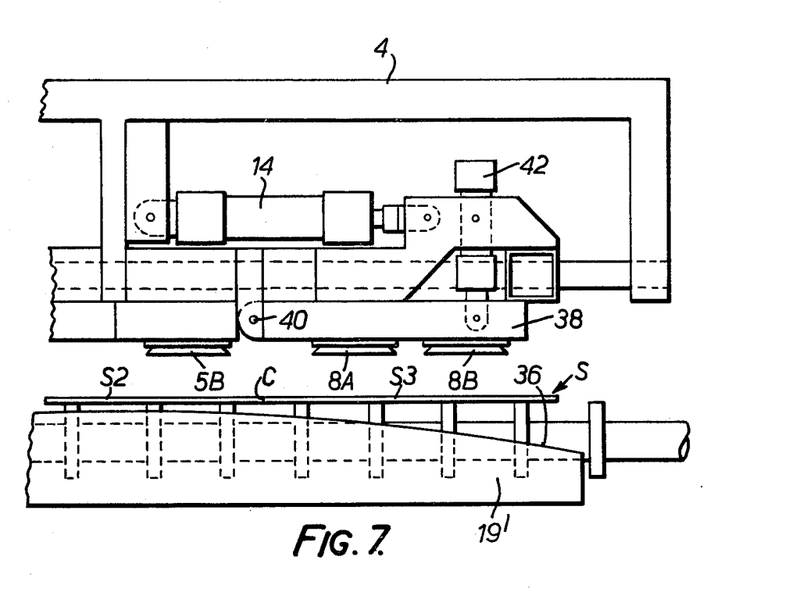
FIGS. 7, 8 and 9 are detail views illustrating the operation of the apparatus of FIGS. 5 and 6.
Figure 8:
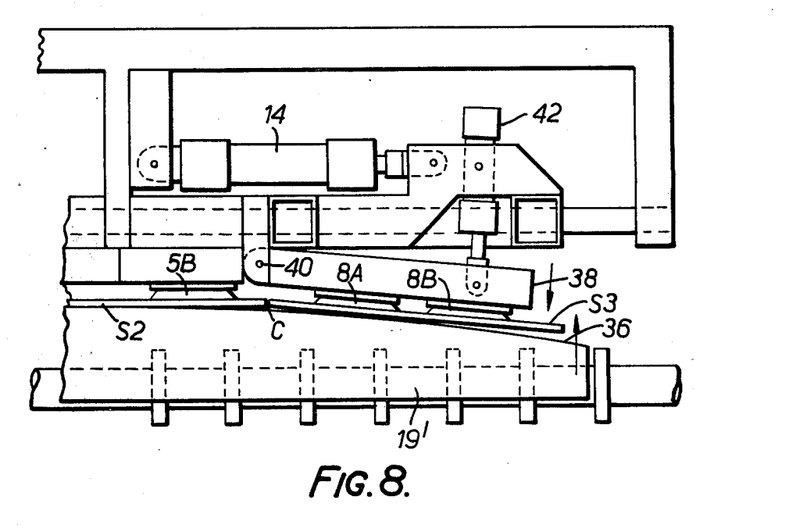
Figure 9:
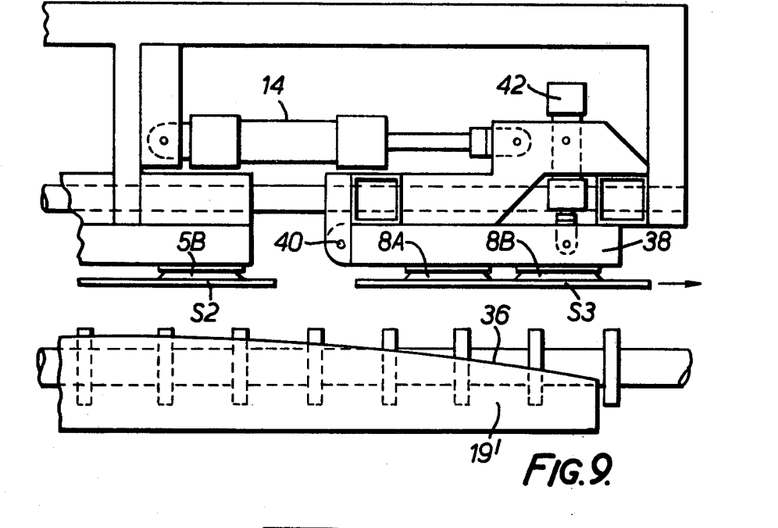

FIG. 5 shows a similar arrangement to that of FIG. 2 but modified so that snapping of the sheets S by running of the cuts in the glass along pre-scored lines is effected actually at the take-off station 2 instead of being carried out before the sheet arrives at the take-off station. To achieve this, the tines 19' of the rising table 18 have a convex upper surface 36, and the outer rows of suction pads 7A, 7B and 8A, 8B are carried out on supports 37 and 38 respectively which are movable about respective horizontal pivots 39 and 40. Such movement is effected by respective hydraulic (or pneumatic) jacks 41 and 42. The operation on one side of the sheet S is illustrated by FIGS. 7, 8 and 9. As the tines 19 rise so that the sheet S is carried upwardly on their convex surfaces 36 towards the suction pads, the jack 42 is actuated to swing the support 38 downwardly about the pivot 40. The outer portion S3 of the sheet is sandwiched between the suction pads 8A, 8B and the convex surfaces 36 of the tines 19' so that this portion of the sheet is forced out of the horizontal plane (FIG. 8) and a bending moment is therefore applied across the scoreline C located between the row of suction pads 5B and the row of suction pads 8A. The glass snaps along the scoreline. The tines 19' are then lowered and the jack 42 operates to return the support 38 (and hence the sheet portion S3 suctionally held by the pads 8A and 8B) to the horizontal. The jack 14 then operates to move the rows of suction pads 8A, 8B away from the centre rows 5A, 5B (FIG. 9) breaking the reinforcing wires in the glass and separating the sheet portions S2, S3 as already described.

Figure 4A:
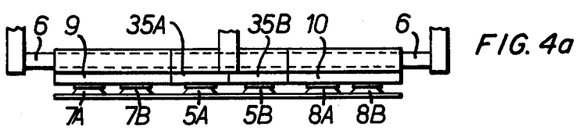
FIGS. 4(a)-4(e) illustrate different arrangements of the apparatus of FIG. 2, for separation of the glass sheets into portions of the forms shown in FIGS. 3(a)-3(e)
Figure 4B:
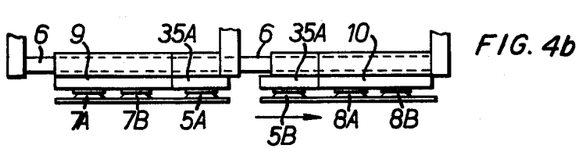
Figure 4C:
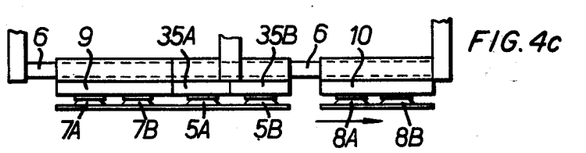
Figure 4D:
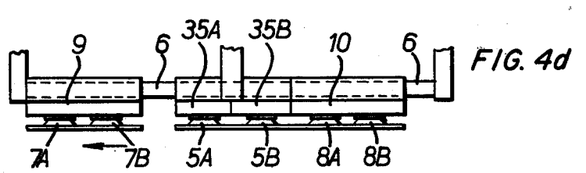
Figure 4E:
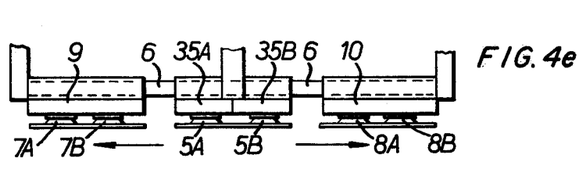
Figure 6:
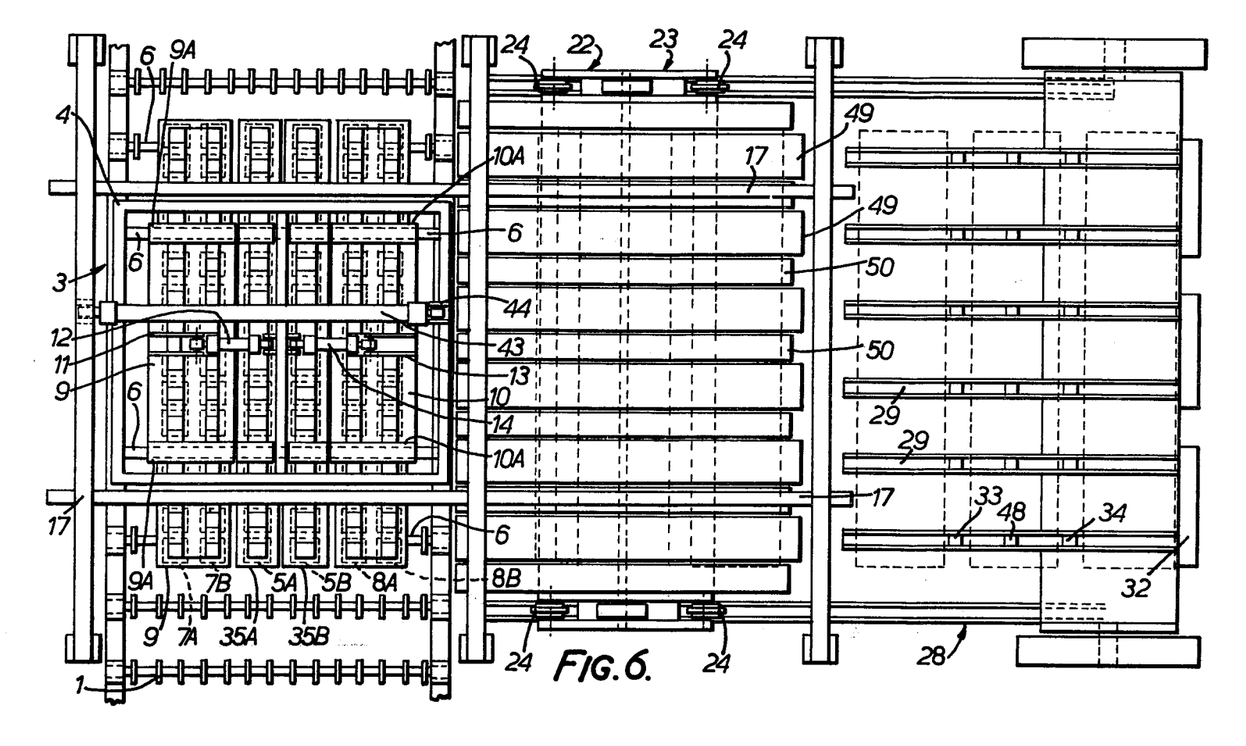
FIG. 6 is a plan view of the apparatus of FIG. 5.

FIGS. 5 and 6 show mechanism for moving the sucker carriage 3 along the gantry 17, comprising a long pneumatic jack 43 connected at one end to a fixed part of the gantry and at the other to a bracket 44 mounted on the sucker carriage frame 4. FIG. 5 also shows the mechanism for raising and lowering the support arms of the transfer carriage 23. This mechanism comprises a scissor-lift arrangement having crossed links 45 with a central pivot 46 driven by a pneumatic vane actuator 47. FIG. 5 further shows the stops 33 and 34 in raised position in the arms 29 of the tilt table 28, as well as a further stop 48 (in lowered position) which can be used when the apparatus is dealing with sheets split into two equal-width portions (as illustrated in FIGS. 3(b) and 4(b)).

FIG. 6 is a plan view of the apparatus of FIG. 5 and shows further details of the stacking table 22 and transfer carriage 23, which are also applicable to the apparatus of FIGS. 1 and 2. The stacking table 22 comprises spaced support arms 49 on which the stacks 25, 26, 27 are built up. The transfer carriage 23 comprises spaced support arms 50 located in the apertures between the stacking table support arms 49 as viewed in plan and which can be raised and lowered by the mechanism 45, 46, 47 mentioned above. When stacks are to be transferred to the tilt table 28, the transfer carriage support arms 50 are raised to lift the stacks from the stacking table support arms 49, and the transfer carriage 23 is then moved towards the tilt table 28, the support arms 50 passing between the horizontal arms 29 of the tilt table. The support arms 50 are then lowered to deposit the stacks from the support arms 50 on to the arms 29 and the transfer carriage is then returned to its position under the stacking table 22.

The facility with which a gripping action or a release action can be effected in one or more selected rows of suction pads independently of the action which is being effected in the other row or rows, as described above, provides a convenient means for rejection of a faulty sheet portion without the need to reject the whole sheet. In particular, if a sheet has a portion containing a fault or faults (found by inspection before arrival at the takeoff station 2), then after the portions have been separated as described above and while the portions are still suctionally held over the conveyor 1, the gripping action can be discontinued in the row or rows of suction pads holding the faulty portion, but maintained in the rows holding good portions. The faulty portion will then drop back on to the conveyor 1 and can be onwardly conveyed thereby to a reject station. The good portions can be transferred to the stacking table and thence to the tilt table in the manner described above.

Figure 11:
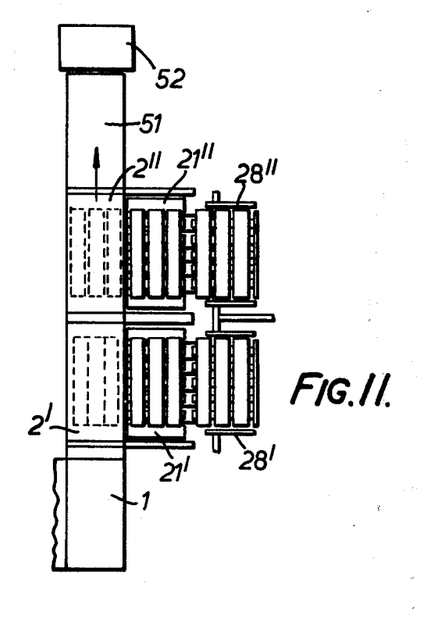
FIG. 11 is a plan view of a layout, with two sheet separating apparatus disposed side by side receiving glass sheets from a common conveyor.

Two (or more) units of apparatus as described above may be located at positions spaced along a common conveyor 1 as shown in FIG. 11, in which 2', 21' and 28' are respectively a first take-off station, stacking station, and tilt table and 2'', 21'' and 28'' are respectively a second take-off station, stacking station, and tilt table. 51 is a continuation of the conveyor 1 for conveying reject portions to a reject (breaking-up) station 52.

Although described above specifically in relation to wired glass sheets, the apparatus could also be useful in handling non-wired glass sheets where it is required to separate each sheet into portions and space the portions apart, and in particular, form them into spaced stacks.

I claim:

1. A method of separating wired glass sheets into spaced separate sheet portions, comprising the steps of:
conveying successive wired glass sheets along a delivery conveyor,
cutting the sheets to define sheet portions but leaving the wires unsevered,
gripping the sheet portions by respective groups of suction gripping devices, and
effecting a relative movement of the groups of suction gripping devices to move said groups apart in a direction substantially parallel to the plane of the sheets and to thereby effect severance of the wires and separation of the sheet portions from one another.

2. A method of separating glass sheets into spaced separate sheet portions comprising the steps of:
conveying successive glass sheets along a delivery conveyor,
cutting the sheets by scoring and snapping the sheets to define sheet portions,
gripping the sheet portions by respective groups of suction gripping devices, and
effecting a relative movement of said groups of gripping devices to move said groups apart in a direction substantially parallel to the plane of the sheets and to thereby separate the sheet portions from one another.

3. A method of separating glass sheets into spaced separate sheet portions, comprising the steps of:
scoring said sheets to define sheet portions,
conveying successive glass sheets along a delivery conveyor,
gripping said sheet portions by respective groups of suction gripping devices,
snapping said sheets while the sheet portions are gripped by the gripping devices, and
effecting a relative movement of the groups of gripping devices to move said groups apart in a direction substantially parallel to the plane of the sheets and thereby to separate the sheet portions from one another.

4. A method of separating glass sheets into spaced separate sheet portions, comprising the steps of:
conveying successive glass sheets along a delivery conveyor,
cutting said sheets to define said sheet portions,
gripping said sheet portions by respective groups of suction gripping devices, and
effecting a relative movement of said groups of gripping devices to move said groups apart in a direction substantially parallel to the plane of said sheets, and thereby to separate said sheet portions from one another, and
further transporting said separated sheet portions, while still held by said gripping devices, laterally to a stacking station, and
releasing by the gripping devices said sheet portions so as to drop said sheet portions onto respective stacks of similar sheet portions.

5. A method according to claim 4, including the step of periodically transferring the stacks from the stacking station to a tilt table and tilting the stacks into a position in which the sheet portions are substantially vertical, for subsequent removal.

6. Apparatus for separating glass sheets into spaced separate sheet portions, said apparatus comprising:
a delivery conveyor for carrying and feeding successively glass sheets which have been worked upon to define the sheet portions to a take-off station,
at least two groups of suction gripping devices disposed at said take-off station so that the respective sheet portions of a sheet delivered by the delivery conveyor can be gripped by respective groups of gripping devices,
mounting means by which said groups are mounted so as to be relatively movable towards and away from one another in a plane substantially parallel to the conveying plane of the delivery conveyor, means for moving apart sad groups of gripping devices so as to separate the respective sheet portions gripped thereby, and means for lifting the glass sheets from the delivery conveyor into engagement with the suction gripping devices.

7. Apparatus according to claim 6, wherein the delivery conveyor is a roller conveyor and the means for lifting the glass sheets comprises a series of tines which extend transversely to the conveying direction, and which can be raised and lowered between successive rollers of said conveyor.

8. Apparatus according to claim 7, for use with glass sheets which have been worked by being pre-cut before delivery by the conveyor, wherein the upper surfaces of the tines are horizontal.

9. Apparatus according to claim 7 for use with glass sheets which have been worked by being pre-scored before delivery by the conveyor, wherein the upper surfaces of the tines are curved, and said mounting means incorporate a pivotal mounting for at least some of the groups of suction gripping devices, so as to apply a bending moment to the glass sheets as each sheet is lifted into engagement with the gripping devices and thereby to cause snapping of the sheet along the score line or lines.

10. Apparatus for separating glass sheets into spaced separate sheet portions, said apparatus comprising:

a delivery conveyor for carrying and feeding successively glass sheets which have been worked upon to define the sheet portions to a take-off station, at least two groups of suction gripping devices disposed at said take off station so that the respective sheet portions of a sheet delivered by the delivery conveyor can be gripped by respective groups of gripping devices, mounting means by which said groups are mounted so as to be relatively movable towards and away from one another in a plane substantially parallel to the conveying plane of the delivery conveyor, means for moving apart said groups of gripping devices so as to separate the respective sheet portions gripped thereby, and means for connecting the groups of suction gripping devices through respective independently controllable valves to a source of suction so that a gripping action or a release action can be effected in one or more groups independently of the other group or groups.

11. Apparatus according to claim 10, wherein the groups of suction gripping devices are also connectible through said valves to a source of compressed air to assist the release action.

12. Apparatus for separating glass sheets into spaced separate sheet portions, said apparatus comprising:

a delivery conveyor for carrying and feeding successively glass sheets which have been worked upon to define the sheet portions to a take-off station, at least two groups of suction gripping devices disposed at said take-off station so that the respective sheet portions of a sheet delivered by the delivery conveyor can be gripped by respective groups of gripping devices, mounting means by which said groups are mounted so as to be relatively movable towards and away from one another in a plane substantially parallel to the conveying plane of the delivery conveyor, means for moving apart said groups of gripping devices so as to separate the respective sheet portions gripped thereby, and wherein said mounting means for the groups of suction gripping devices are carried on a common carriage, and means for mounting said common carriage for movement laterally from a take-off station above the delivery conveyor to a stacking station to one side of the conveyor.

13. Apparatus according to claim 12, wherein the stacking station comprises a stacking table disposed to receive the separated sheet portions from the suction gripping devices and to accumulate spaced stacks of the sheet portions.

14. Apparatus according to claim 13, wherein the stacking table is apertured to accommodate stack-supporting arms of a transfer carriage, and means are provided for raising and lowering said stack-supporting arms, whereby the stacks can be lifted from the stacking table to become supported on said transfer carriage.

15. Apparatus according to claim 14, further comprising a tilt table arranged to receive the stacks from the transfer carriage and to tilt them into a substantially vertical position for subsequent removal.

16. Apparatus according to claim 15, wherein the tilt table comprises a plurality of pivoted arms between which the stack-supporting arms of the transfer carriage can fit, for receiving the stacks, and retractable stops on said pivoted arms, disposed so as to be capable of separating said stacks and of supporting them when the pivoted arms are swung into said substantially vertical position.

* * * * *